United States Patent [19]
Sweet

[11] 3,805,500
[45] Apr. 23, 1974

[54] GRASS CUTTINGS CATCHER FOR ROTARY LAWN MOWER

[76] Inventor: Dale F. Sweet, P.O. Box 757, Chandler, Ariz. 85224

[22] Filed: July 27, 1972

[21] Appl. No.: 275,468

[52] U.S. Cl. .............................. 56/202, 56/16.6
[51] Int. Cl. .......................................... A01d 53/06
[58] Field of Search ........................... 56/194–206, 56/320.2, 16.6

[56] References Cited
UNITED STATES PATENTS

| | | | |
|---|---|---|---|
| 2,973,614 | 3/1961 | Horner et al. | 56/320.2 |
| 3,129,550 | 4/1964 | Waag | 56/199 |
| 3,133,396 | 5/1964 | Leader | 56/202 |
| 3,618,157 | 11/1971 | Bassin | 56/202 X |

Primary Examiner—Russell R. Kinsey
Attorney, Agent, or Firm—William H. Drummond

[57] ABSTRACT

An improved grass-cuttings catcher for a rotary lawn mower. The catcher includes a frame mounted on a set of wheels separate from the mower such that the weight of the frame and the storage bag are supported independently of the mower. A duct conveys the grass cuttings from the mower blade housing to the bag. The catcher is detachably secured to the mower by a mounting system which provides directional and lateral stability to the catcher but which allows for vertical dis-placement of the catcher with respect to the mower such that stability of the mower is not affected by the catcher on uneven terrain.

2 Claims, 10 Drawing Figures

PATENTED APR 23 1974

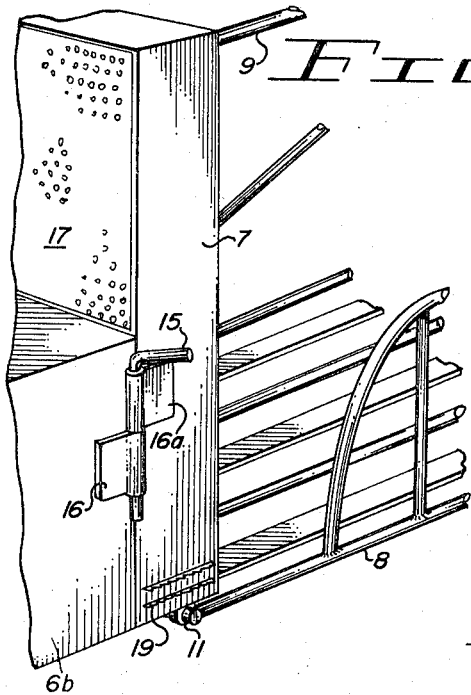
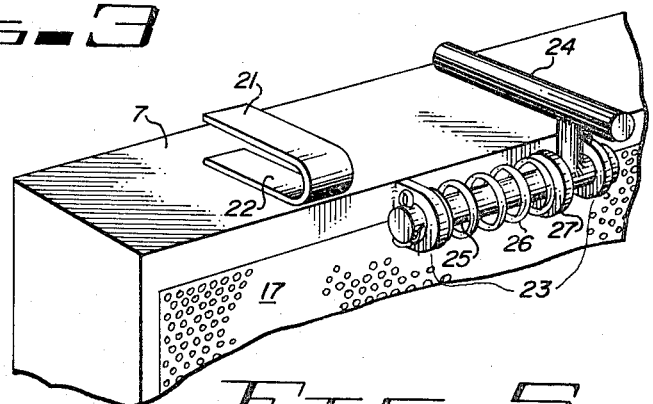
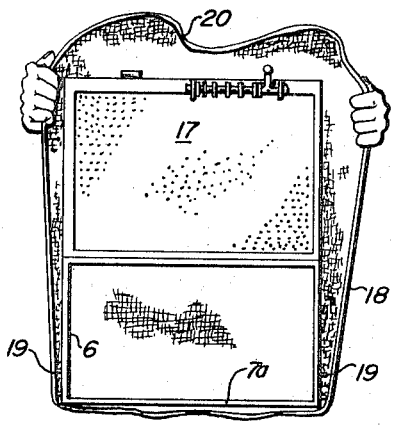
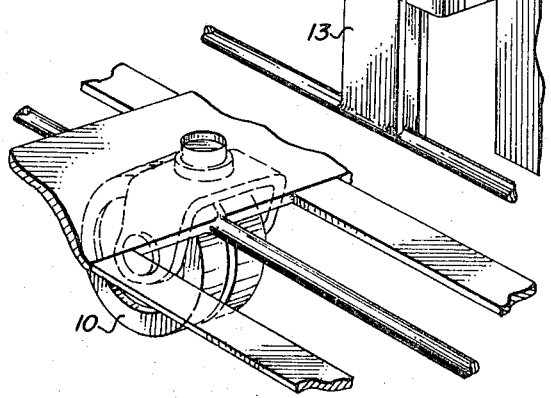
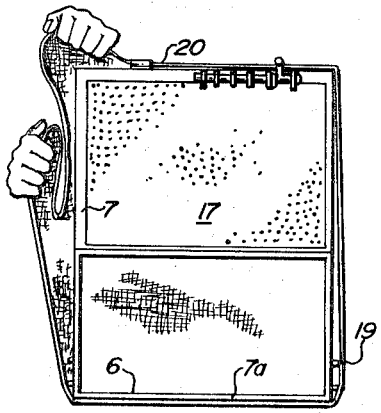
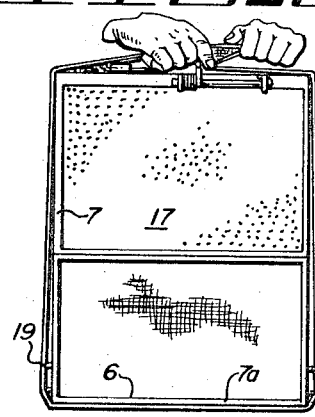
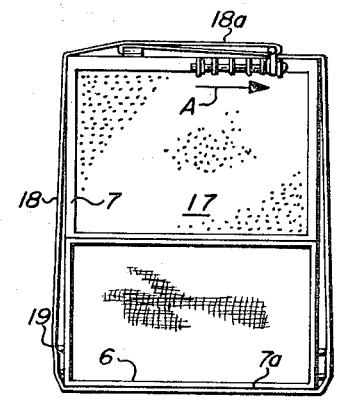

GRASS CUTTINGS CATCHER FOR ROTARY LAWN MOWER

This invention relates to improvements for a rotary lawn mower.

More particularly, this invention concerns a grass-catcher attachment for rotary lawn mowers.

In one respect, the invention pertains to a grass-catcher attachment which is detachably secured to the lawn mower and which is provided with separate wheels to suspend the weight of the grass catcher substantially independently of the mower and which is attached to the lawn mower in such manner as to provide directional and lateral stability while allowing the grass-catcher attachment to move up and down independently of the mower, thereby providing for increased stability of the mower on uneven terrain.

Various sytems have been devised for disposing of the grass cuttings from lawn mowers. In the case of reel-type mowers, a simple cloth basket is usually attached to the rear of the mower. The basket catches the grass cuttings ejected to the rear of the reel and is emptied periodically. A substantially similar system has been used with rotary mowers and usually takes the form of a detachable cloth bag or screen wire basket suspended to one side or to the rear of the mower.

More recently, with the wide-spread advent of self-propelled "riding"lawn mowers, the problem of efficient temporary storage of grass cuttings has become more acute since the riding mowers can mow substantially larger areas of a lawn in a much shorter time that previous "walking" mowers. The efficiency of riding mowers is reduced because of the frequency with which it is necessary to stop the mower and empty the grass catcher. Attempts to reduce the frequency of emptying the grass catcher by the expedient of simply providing a larger storage bag or basket were only partially successful since the increased weight of the grass cuttings adversely affected the stability of the mower on uneven terrain, making it less maneuverable and causing thhe mower to cut the grass unevenly.

Accordingly, it is an object of the invention to provide a grass catcher attachment for a rotary lawn mower.

Another object of the invention is to provide a grass-catcher attachment which can be conveniently and quickly secured to the mower and removed therefrom after the mowing job is completed.

Another object of the invention is to provide a grass-catcher attachment for rotary lawn mowers having a higher temporary storage capacity for grass cuttings, which is suspended independently of the mower such that it has little or no effect on the stability of the mower.

These and other, further and more specific objects and advantages of the invention will be apparent to those skilled in the art from the following detailed description thereof taken in conjunction with the drawings, in which;

FIG. 3 is an enlarged partial perspective view of the opposite side of the grass catcher of FIG. 2 illustrating the means of attaching the grass catcher to the mower;

FIGS. 4a and 4b are enlarged partial perspective views of portions of the grass catcher of FIGS. 1–3 showing details of the independent suspension;

FIG. 5 is an enlarged perspective view of a portion of the grass catcher showing details of the apparatus for attaching the grass-cuttings storage bag to a duct communicating with the mower blade housing;

FIGS. 6–9 are a series of views illustrating the steps in attaching the grass-cuttings storage bag to the duct.

Figure 1:
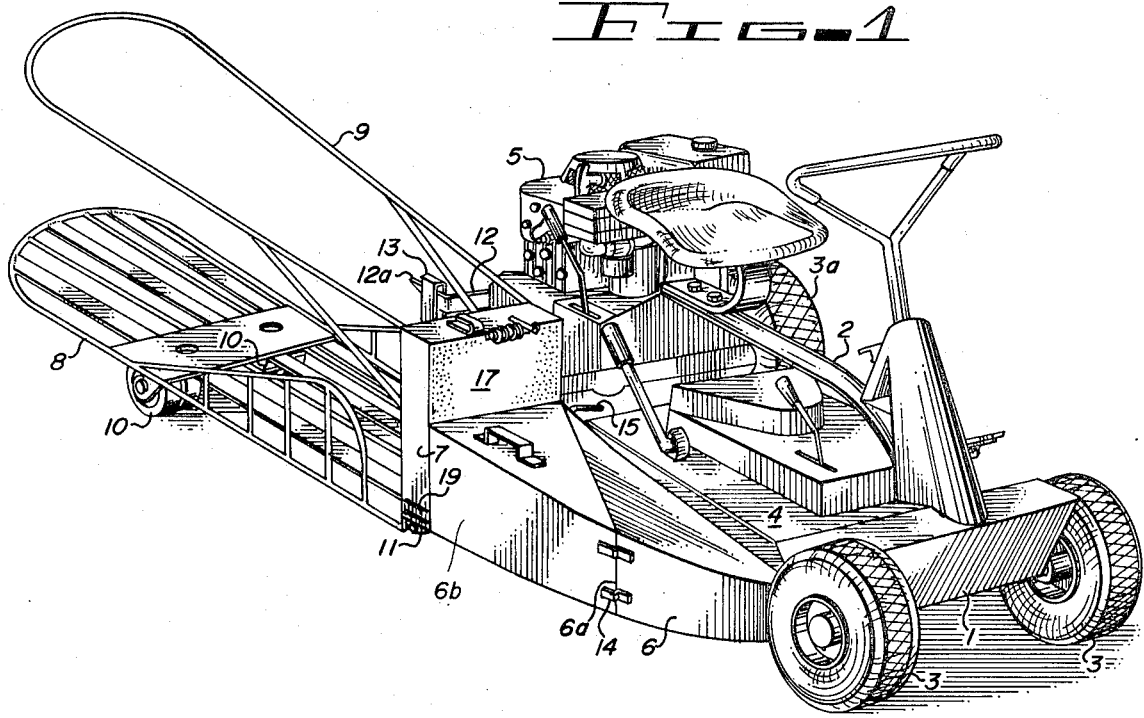
FIG. 1 is a perspective view of an improved grass-catcher attachment embodying the present invention detachably secured to a typical riding lawn mower.
Figure 2:
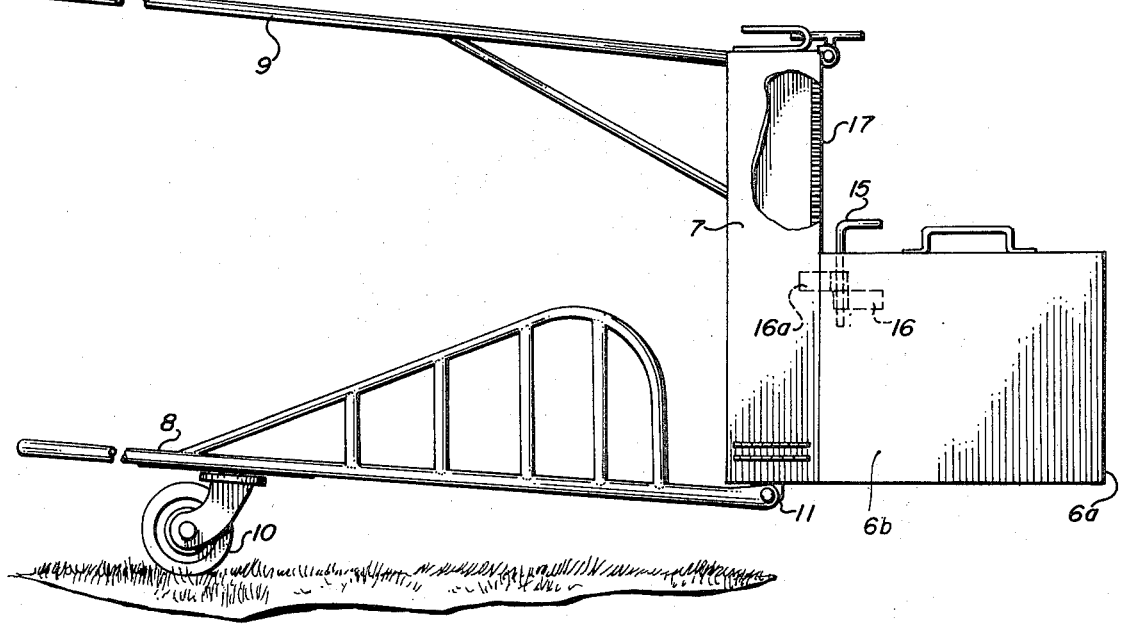
FIG. 2 is a side view of the grass-catcher attachment of FIG. 1.

Turning now to the drawings, FIG. 1 illustrates a conventional self-propelled riding mower generally indicated by reference character 1. The mower includes a frame 2 and wheels 3 carried by the frame for supporting the frame above the ground. A housing 4 supported by frame 2 encloses the rotary mower blade (not visible) which is driven by the engine 5 through a chain drive and transmission carried below the frame 2. Grass clippings which are ejected from the mower blade housing 4 pass through an upwardly and outwardly diverging duct 6 and are collected in a porous bag (not shown) attached at its open end to a bag-attaching frame 7 formed integrally at or fixed to the end of the duct extension 6b. In operative position, the bag rests on and is supported by the grass catcher frame 8. The hoop 9 passes into the interior of the bag and holds the bag open as it is filled with grass clippings. The weight of the bag and clippings contained therein is supported by the wheels 10. The frame 8 is attached by means of a hinge 11 to the bottom of frame 7.

An L-shaped stabilizer bar 12 attached to the rear of the mower extends laterally toward the grass catcher and the rearward extension 12a passes through a stabilizer bracket 13 attached to the grass catcher frame. This provides lateral stability for the grass catcher while allowing the frame 8 to move up and down independently of the mower.

It will be noted from FIG. 1 that the weight of the grass-catcher frame 8 and the grass clippings are supported by the wheels 10 substantially independently such that the weight is not transferred to the rear wheels 3a of the mower.

The manner in which the grass catcher assembly is attached and removed from the mower will be apparent from FIGS. 1 – 4a and 4b. The front edge 6a of an intermediate portion of the duct 6 slips under brackets 14 mounted on the duct 6. A retainer pin 15 engages locating brackets 16 and 16a mounted respectively on the mower side of said duct 6 and frame 7. The rearwardly extending portion 12a of the stabilizer bar 12 passes through the slot of the upstanding stabilizer bracket 13 mounted on the frame 8. It will be apparent, therefore, that the grass catcher assembly can be very quickly and conveniently attached and detached from the mower by simultaneously engaging the duct edge 6a under the brackets 14 and the stabilizer extension 12a in the bracket 13 and then dropping the retainer pin 15 into the brackets 16 and 16a.

A porous screen 17 formed of expanded metal or the like is provided above the duct 6 to allow air in which the grass cuttings are entrained to escape from the bag. It will be appreciated that this feature could be omitted if the bag is sufficiently porous.

Referring to FIGS. 5–9, which show the method of attaching an empty bag to the frame 7 at the end of the duct 6, the open mouth of the bag 18, which has a larger circumference than the circumference of the frame 7, is fitted under the bottom 7a of the frame 7 where it is held in place by engagement with the serrated members 19 projecting outwardly from the sides of the frame 7, as shown in FIG. 6. As shown in FIG. 7, the forward edge 20 of the bag 18 is then passed under the rearwardly extending fixed finger member 21 of a first bracket member 22 fixed to the outer or top surface of the frame 7. The mouth of the bag 18 is then drawn tightly around the periphery of the frame 7 and is folded back over the top of the fixed finger 21 in the manner shown in FIG. 8.

A second bracket member 23 peripherally spaced from the first bracket member 22 on the frame 7 has a movable finger 24 which is carried on a slide bar 25. A spring 26 urges the sliding member 27 away from the fixed finger 21. After the bag is folded back over the finger 21 as shown in FIG. 8, the movable finger 24 is retracted against the spring 26 and the movable finger is inserted inside the bag. When the slide 27 is released, it moves away from the bracket 22 in the direction of the Arrow A, pulling the folded portion 18a of the bag and snugly securing the bag 18 all around the periphery of the frame 7.

After the bag has filled with grass clippings, it is removed from the grass catcher by reversing the steps of FIGS. 6–9. As will be apparent, the invention provides an exceedingly simple and rapid method for attaching and releasing the bag from the grass catcher.

As will be apparent to those skilled in the art, the movable finger 24, slide bar 25, spring 26 and sliding member 27 could be replaced with any suitable device for holding the folded mouth of the bag under appropriate tension such that it snugly secures the bag around the periphery of the frame 7. For example, after the mouth of the bag is folded back over the top of the fixed finger 21, as shown in FIG. 8, the folded portion could be simply clamped against the frame 7 or the fabric of the folded portion could be impaled on a sharpened member extending upwardly from the frame 7.

Having fully described my invention and the presently preferred embodiments thereof, I claim:

1. An improved grass-cuttings catcher adapted to be attached to a rotary lawn mower having duct means for expelling cuttings tangentially from the mower blade housing, said catcher comprising:
   a. a duct extension having an inlet adapted to be detachably fixedly secured to said duct means and having means defining a bag-attaching frame at the outlet thereof;
   b. an elongate support frame pivotally secured at its forward end to said duct extension and extending rearwardly therefrom to permit relative vertical displacement of said frame with respect to the mower and said duct extension;
   c. ground-contacting wheel means on said frame for supporting said elongate support frame substantially independently of said mower; and
   d. a grass-cuttings temporary storage bag supported by said elongate support frame, the open mouth of which is detachably secured to said bag-attaching frame.

2. Improved grass-cuttings catcher of claim 1 which also includes:
   a. an upstanding generally U-shaped stabilizer bracket affixed to said elongate support frame; and
   b. a generally L-shaped stabilizer bar, one leg of which is adapted to be affixed to said mower extending laterally toward said elongate support frame and the other leg of which extends rearwardly of said mower through said stabilizer bracket.

* * * * *